(12) United States Patent
Webb et al.

(10) Patent No.: US 9,845,043 B1
(45) Date of Patent: Dec. 19, 2017

(54) PROJECTED LASER LINES/GRAPHICS TO VISUALLY INDICATE TRUCK TURNING PATH

(71) Applicant: DENSO International America, Inc., Southfield, MI (US)

(72) Inventors: Gareth Webb, Farmington, MI (US); Marc Arceo, Livonia, MI (US)

(73) Assignee: DENSO International America, Inc., Southfield, MI (US)

( * ) Notice: Subject to any disclaimer, the term of this patent is extended or adjusted under 35 U.S.C. 154(b) by 0 days.

(21) Appl. No.: 15/183,008

(22) Filed: Jun. 15, 2016

(51) Int. Cl.
- *B60Q 1/28* (2006.01)
- *G08G 1/00* (2006.01)
- *B60K 35/00* (2006.01)

(52) U.S. Cl.
CPC ............ *B60Q 1/28* (2013.01); *B60K 35/00* (2013.01); *G08G 1/22* (2013.01)

(58) Field of Classification Search
CPC ............ B60Q 1/28; B60K 35/00; G08G 1/22
USPC .......................................................... 701/41
See application file for complete search history.

(56) References Cited

U.S. PATENT DOCUMENTS

| | | | |
|---|---|---|---|
| 6,128,559 A | 10/2000 | Saitou et al. | |
| 6,133,851 A | 10/2000 | Johnson | |
| 6,733,134 B2 | 5/2004 | Bleiner | |
| 6,866,232 B1 | 3/2005 | Finney | |
| 6,967,593 B2 | 11/2005 | Carroll | |
| 7,175,321 B1 | 2/2007 | Lopez | |
| 9,551,867 B1 | 1/2017 | Grabowski et al. | |
| 2005/0117364 A1 | 6/2005 | Rennick et al. | |
| 2006/0225329 A1 | 10/2006 | Morrow | |
| 2007/0053195 A1 | 3/2007 | Alberti | |
| 2009/0323046 A1 | 12/2009 | Tan et al. | |
| 2010/0017111 A1* | 1/2010 | Stefani | B60Q 1/50 701/533 |
| 2010/0256852 A1 | 10/2010 | Mudalige | |
| 2012/0025962 A1 | 2/2012 | Toll | |
| 2013/0335212 A1 | 12/2013 | Purks et al. | |
| 2015/0203023 A1* | 7/2015 | Marti | B60Q 1/00 340/425.5 |

(Continued)

FOREIGN PATENT DOCUMENTS

| | | | | |
|---|---|---|---|---|
| EP | 2985182 A2 * | 2/2016 | ............ | B60Q 1/22 |
| JP | 2004-182121 A | 7/2004 | | |
| JP | 2015-137097 A | 7/2015 | | |

OTHER PUBLICATIONS

U.S. Appl. No. 15/183,060, filed Jun. 15, 2016, Denso International America, Inc.

(Continued)

*Primary Examiner* — Brian P Sweeney
(74) *Attorney, Agent, or Firm* — Harness, Dickey & Pierce, P.L.C.

(57) ABSTRACT

A system and method are provided and include a light source projector with a positional actuator mounted on a subject vehicle that projects laser lines on a roadway upon which the subject vehicle is traveling. A controller receives steering angle data from a steering system of the subject vehicle, the steering angle data corresponding to a steering angle of the subject vehicle. The controller determines a turning path of the subject vehicle based on the steering angle data and controls the positional actuator to project the laser lines on the roadway to correspond to the determined turning path of the subject vehicle.

20 Claims, 6 Drawing Sheets

(56) References Cited

U.S. PATENT DOCUMENTS

2016/0019782 A1    1/2016   Alam et al.
2016/0026187 A1    1/2016   Alam et al.
2016/0357187 A1   12/2016   Ansari

OTHER PUBLICATIONS

U.S. Appl. No. 15/182,948, filed Jun. 15, 2016, Denso International America, Inc.

* cited by examiner

PROJECTED LASER LINES/GRAPHICS TO VISUALLY INDICATE TRUCK TURNING PATH

FIELD

The present disclosure relates to systems and methods that project laser lines and graphics onto a road surface for indicating a turning path of a vehicle, such as a truck.

BACKGROUND

This section provides background information related to the present disclosure, which is not necessarily prior art.

Drivers of large vehicles, such as semi-trailer trucks, can have difficulty making tight turns and gauging the clearance and path of the vehicle relative to objects, such as other vehicles, in the vicinity of the vehicle. For example, due to the height of the cab in a semi-trailer truck, the left hand drive seating position, and the distance of the turn radius, it can be difficult for the driver of a semi-trailer truck to make a right-hand turn around a corner. For example, it can be difficult for the driver of a semi-trailer truck to accurately gauge the clearance of the semi-trailer truck relative to on-coming traffic, relative to vehicles in a parallel turn lane, and relative to objects located on the corner around which the semi-trailer truck is turning.

SUMMARY

This section provides a general summary of the disclosure, and is not a comprehensive disclosure of its full scope or all of its features.

The present teachings include systems and methods for projecting laser lines and graphics onto a roadway. A light source projector with a positional actuator mounted on a subject vehicle projects laser lines on a roadway upon which the subject vehicle is traveling. A controller receives steering angle data from a steering system of the subject vehicle, the steering angle data corresponding to a steering angle of the subject vehicle. The controller determines a turning path of the subject vehicle based on the steering angle data and controls the positional actuator to project the laser lines on the roadway to correspond to the determined turning path of the subject vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
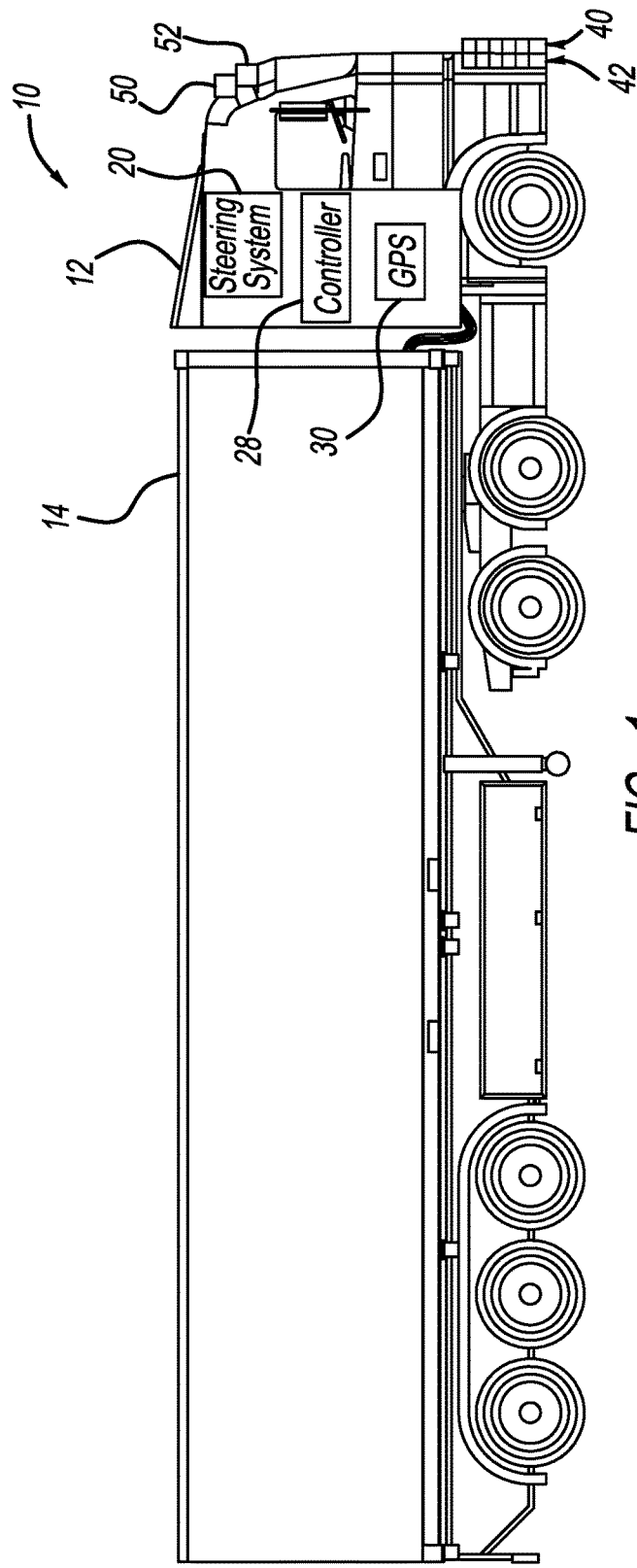
FIG. 1 illustrates a subject vehicle with a laser line and graphics projection system.

With reference to FIG. 1, a vehicle 10 including a laser line and graphics projection system is illustrated. Although the vehicle 10 is illustrated as a semi-trailer truck in FIG. 1, the present teachings apply to any other suitable vehicle, such as an automobile, sport utility vehicle (SUV), a mass transit vehicle (such as a bus), or a military vehicle, as examples. In the example of FIG. 1, the vehicle 10 includes a tractor unit 12 and a semi-trailer 14 that is coupled to and towed by the tractor unit 12.

The vehicle 10 includes a steering system 20 and a controller 28 that controls the laser line and graphics projection system, as discussed in further detail below. The vehicle 10 can also include a global positioning system (GPS) 30 that detects or determines a current location of the vehicle 10. In this application, including the definitions below, the terms "controller," "module," and "system" may refer to, be part of, or include circuits or circuitry that may include processor hardware (shared, dedicated, or group) that executes code and memory hardware (shared, dedicated, or group) that stores code executed by the processor hardware. The code is configured to provide the features of the controller, modules, and systems described herein. In addition, in this application the terms "module" or "controller" may be replaced with the term "circuit."

The vehicle can also include an image sensor 50, such as a camera, and an environmental sensor 52, such as Lidar sensors, radar sensors, ultrasonic sensors, or other sensors mounted on the front of the tractor unit 12. The image sensor 50 and the environmental sensor 52 detect information about the surroundings of the vehicle 10, including, for example, other vehicles, lane lines, guard rails, objects in the roadway, building, pedestrians, etc. Data from the image sensor 50 and the environmental sensor 52 can be communicated to and received by the controller 28.

The vehicle 10 includes a bank of light source projectors 40 on a front portion of the vehicle 10, such as a front portion of the tractor unit 12, with each light source projector 40 having a corresponding positional actuator 42. In the example of FIG. 1A, the light source projectors 40 are positioned on a lower front portion of the tractor unit 12. Additionally or alternatively, the light source projectors 40 can be positioned at other locations on the tractor unit 12. While a single bank of light source projectors 40 is shown in FIG. 1, the vehicle 10 can have multiple banks of light source projectors 40 mounted to the vehicle. For example, the vehicle 10 may have a first bank of light source projectors 40, with corresponding positional actuators 42, mounted on a lower driver side of the front of the vehicle 10, such as a lower front driver side of the tractor unit 12, and a second bank of light source projectors 40, with corresponding positional actuators 42, mounted on a lower passenger side of the front of the vehicle 10, such as a lower front passenger side of the tractor unit 12. The light source projectors 40 can include a suitable light source, such as a laser diode emitting a laser beam of visible light. Additionally or alternatively, the light source projectors 40 can include other light emitting diodes (LEDs), or other light sources, such as incandescent light sources, halogen light sources, xenon light sources, light bulbs, or other suitable light sources configured to produce a suitable beam of light that can be focused and directionally projected onto the roadway of the vehicle.

The positional actuators 42 can adjust a directional position of the light source projectors 40 to project laser lines and graphics onto a roadway upon which the vehicle 10 is traveling. For example, the bank of light source projectors 40 on the front of the tractor unit 12 can be positioned and controlled by the controller 28 to project laser lines and graphics onto an area of the roadway in front of the tractor unit 12. For example, one or more of the light sources in the bank of light source projectors 40 can be rapidly positioned by the corresponding positional actuator to rapidly trace an outline of a laser line and/or graphic on the roadway of the vehicle. In this way, the controller 28 can control the positional actuators 42 such that the light source projectors 40 project laser lines and graphics onto the roadway in front of the vehicle 10. The term laser lines, as used in the context of the laser lines projected by the light source projectors 40 onto the roadway, refer to a clearly defined and distinct line of light projected onto the roadway (shown, for example, as laser lines 60 and 62 in FIGS. 2 through 6 and laser lines 64 and 66 in FIG. 3).

The controller 28 can control the positional actuators 42 such that the light source projectors 40 project laser lines indicating a turning path of the vehicle 10. For example, the controller 28 can receive data from the steering system 20 indicating a current steering angle based on the rotational position of the steering wheel of the vehicle 10. In addition, the controller 28 can be preprogrammed with information about the vehicle 10, including, for example, the dimensions of the vehicle 10, such as the dimensions of the tractor unit 12, and the location and size of the wheels on the vehicle 10. The controller 28 can store the information about the vehicle 10 in a non-volatile memory. Alternatively, the vehicle information can be stored remotely, such as in an accessible server, and retrieved by the controller 28 via communication over a network, such as the Internet. Based on the current steering angle received from the steering system 20, and the preprogrammed information about the vehicle 10, the controller 28 can determine a turning path of the vehicle 10. Based on the determined turning path of the vehicle 10, the controller 28 can control the positional actuators 42 for the light source projectors 40 to project laser lines corresponding to the determined turning path of the vehicle 10. Further, as the driver of the vehicle adjusts the steering angle by turning the steering wheel of the vehicle 10, the controller 28 can likewise update the determined turning path of the vehicle 10 and control the positional actuators 42 for the light source projectors 40 to adjust the projected laser lines corresponding to the updated turning path of the vehicle 10. For example, as the steering angle increases or decreases, the controller 28 can make commensurate adjustments to the determined turning path of the vehicle 10 and control the positional actuators 42 for the light source projectors to project curved laser lines that accurately correspond to the determined turning path of the vehicle 10.

Further, the controller 28 can receive data from the image sensor 50 and the environmental sensor 52 about the surroundings of the vehicle 10, including, for example, other vehicles, lane lines, guard rails, objects in the roadway, building, pedestrians, etc., as well as information about the location of the vehicle 10 from the GPS 30, to evaluate the current determined turning path in light of the surroundings of the vehicle 10. For example, the controller 28 can determine whether the determined turning path of the vehicle is such that the vehicle 10 will collide with another object, such as another vehicle, a guard rail, object in the roadway, building, pedestrian, etc., if it were to continue on its current turning path. As described in further detail below, in such case the controller 28 can alert the driver of the vehicle 10 by changing a color of the laser lines 60, 62, and/or displaying a graphical warning display or instruction on the roadway in front of the vehicle.

Figure 2:
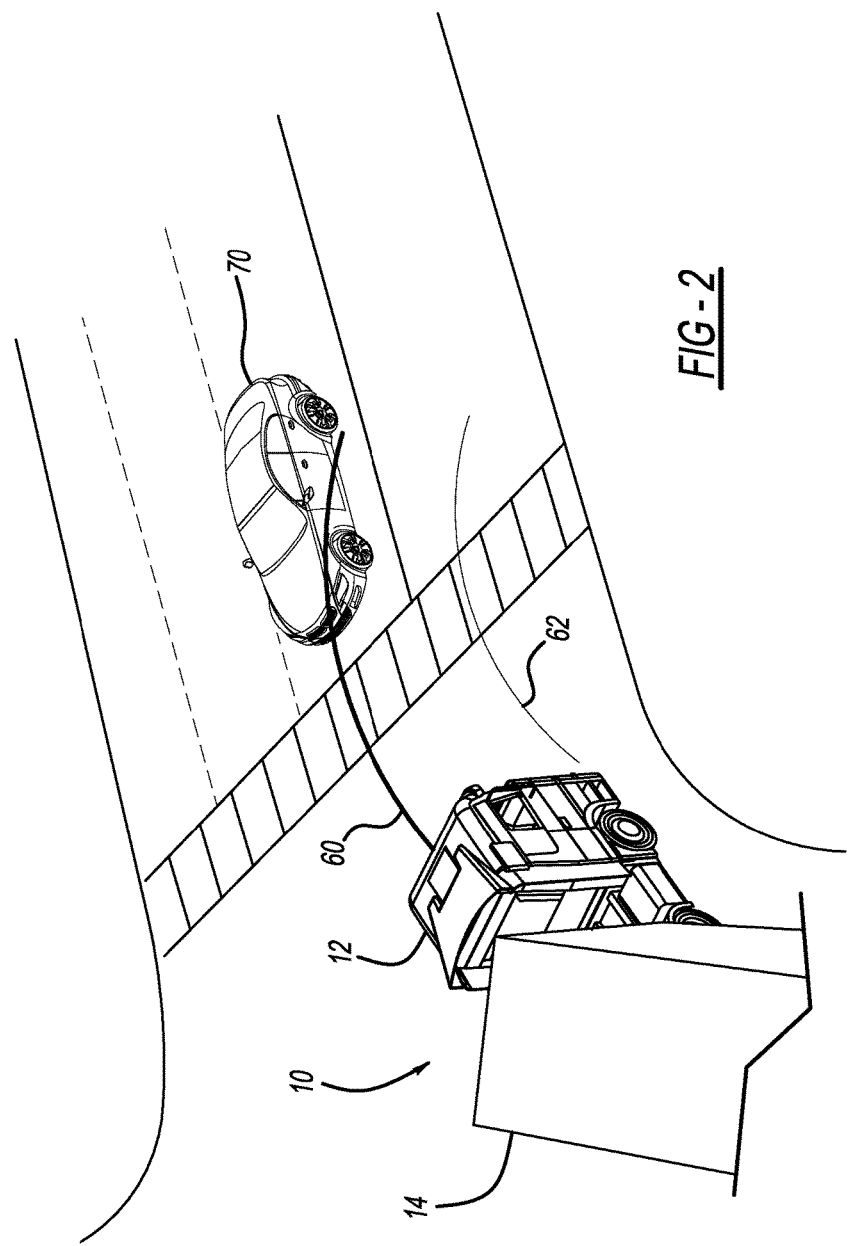
FIG. 2 illustrates the subject vehicle turning a corner with the laser line and graphics projection system projecting laser lines on the roadway to visually indicate the truck turning path.

With reference to FIG. 2, the vehicle 10 is shown making a right-hand turn around a corner. As described above, based on the current steering angle received from the steering system 20 and the preprogrammed and stored information about the vehicle, the controller 28 can determine a turning path of the vehicle 10. Further, based on the determined turning path, the controller 28 can control the positional actuators 42 (shown in FIG. 1) for the light source projectors 40 (shown in FIG. 1) to project laser lines 60, 62 on the roadway of the vehicle 10 corresponding to the determined turning path of the vehicle 10. For example, as shown in FIG. 2, two projected laser lines 60, 62 are shown, with one projected laser line 60 corresponding to a driver-side edge or driver-side tire of the vehicle 10 and another projected laser line 62 corresponding to a passenger-side edge or a passenger-side tire of the vehicle 10.

As further described above, the controller 28 can receive data from the image sensor 50 and the environmental sensor 52 about the surroundings of the vehicle 10. In the example of FIG. 2, the image sensor 50 and/or the environmental sensor 52 can detect a secondary vehicle 70. For example, based on data received from the image sensor 50 and the environmental sensor 52, the controller 28 can determine a location of the secondary vehicle 70 relative to the vehicle 10 and relative to the current determined turning path of the vehicle 10. Further, the controller 28 can compare the determined location of the secondary vehicle 70 with the determined turning path of the vehicle 10 and determine whether the secondary vehicle 70 is currently positioned within the current determined turning path of the vehicle 10. If, for example, the secondary vehicle 70 is currently positioned with the current determined turning path of the vehicle, a collision between the vehicle 10 and the secondary vehicle 70 may occur if the vehicle 10 were to continue on its current turning path. In such case, the controller 28 can take action to alert the driver of the vehicle 10 and/or the driver of the secondary vehicle 70. For example, the controller 28 can change the color of one or more of the projected laser lines 60, 62. For example, the projected laser lines 60, 62 may appear green if there are no objects located within the determined turning path of the vehicle 10. The controller 28 can then control the light source projectors 40 to change one or more of the laser lines 60, 62 to red when an object, such as the secondary vehicle 70, is located within the determined turning path of the vehicle 10. For example, in FIG. 2, the projected laser line 60 can appear in a first color, such as red, while the projected laser line 62 can appear in a second color, such as green. Alternatively, the controller 28 could control the light source projectors 40 to change both projected laser lines 60, 62 to the same color, such as red. Additionally or alternatively, the controller 28 could control the light source projectors 40 to flash or blink one of the projected laser lines 60, 62 to indicate that an object, such as the secondary vehicle 70, is located within the turning path of the vehicle 10. Additionally or alternatively, the controller 28 can generate an alert, such as an audible or visual alert within the cab of the tractor unit 12.

In this way, the controller 28 can alert the driver of the vehicle 10 and/or the driver of the secondary vehicle 70 that the secondary vehicle 70 is located within a turning path of the vehicle 10. For example, the driver of the vehicle 10 can view that the projected laser line 60 is overlapping the secondary vehicle and/or can view that the projected laser line 60 is a different color and/or flashing or blinking. In addition, the driver of the secondary vehicle 70 can view that a projected laser line 60 is positioned on the hood of the secondary vehicle 70 and/or that the projected laser line 60 is a different color and/or flashing or blinking.

Figure 3:
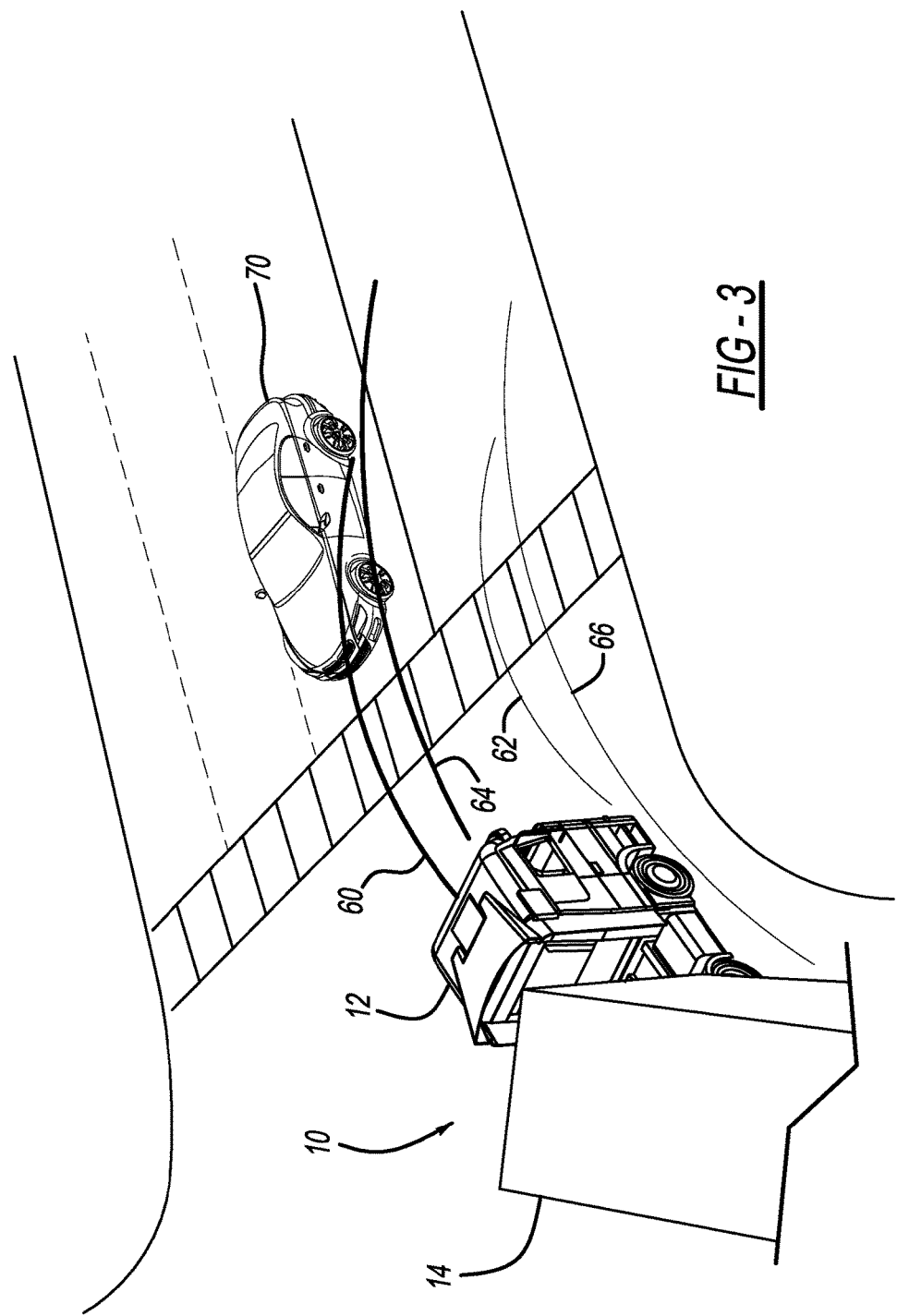
FIG. 3 illustrates the subject vehicle turning a corner with the laser line and graphics projection system projecting laser lines on the roadway to visually indicate the turning path of the tractor unit and of the semi-trailer.

With reference to FIG. 3, the controller 28 can also determine a turning path of the semi-trailer 14 of the vehicle 10. For example, the controller 28 can be preprogrammed with information about the semi-trailer 14 of the vehicle 10, including, for example, the dimensions of the semi-trailer 14, the location and size of the wheels on the semi-trailer 14, and the location of the hitch connection between the semi-trailer 14 and the tractor unit 12. The controller 28 can store the information about the semi-trailer 14 in a non-volatile memory. Alternatively, the vehicle information can be stored remotely, such as in an accessible server, and retrieved by the controller 28 via communication over a network, such as the Internet. Based on the current steering angle received from the steering system 20, and the preprogrammed information about the semi-trailer 14, the controller 28 can determine a turning path of the semi-trailer 14. Based on the determined turning path of the vehicle 10, the controller 28 can control the positional actuators 42 for the light source projectors 40 to project laser lines 64, 66 corresponding to the determined turning path of the semi-trailer. Further, as the driver of the vehicle adjusts the steering angle by turning the steering wheel of the vehicle 10, the controller 28 can likewise update the determined turning path of the semi-trailer 14 and control the positional actuators 42 for the light source projectors 40 to adjust the projected laser lines 64, 66 corresponding to the updated turning path of the semi-trailer 14. For example, as the steering angle increases or decreases, the controller 28 can make commensurate adjustments to the determined turning path of the vehicle 10 and control the positional actuators 42 for the light source projectors to project curved laser lines 64, 66 that accurately correspond to the determined turning path of the semi-trailer 14. In this way, as shown in FIG. 3, the controller 28 can control the positional actuators 42 for the light source projectors 40 to project a first set of projected laser lines 60, 62 corresponding to a turning path of the tractor unit 12 and a second set of projected laser lines 64, 66 corresponding to a turning path of the semi-trailer 14. Alternatively, the controller 28 can control the positional actuators 42 for the light source projectors 40 to project only the projected laser lines 64, 66 corresponding to a turning path of the semi-trailer 14.

Further, as described above, the controller 28 can control the light source projectors 40 to change a color of the projected laser lines 64, 66 when an object, such as the secondary vehicle 70, is located within the determined turning path of the semi-trailer 14. Additionally or alternatively, additional light source projectors could be used to project laser lines to the side of the vehicle so that the projected laser lines corresponding to the determined turning path of the semi-trailer 14 could be seen in a rear-view or side mirror of the vehicle 10.

Figure 4:
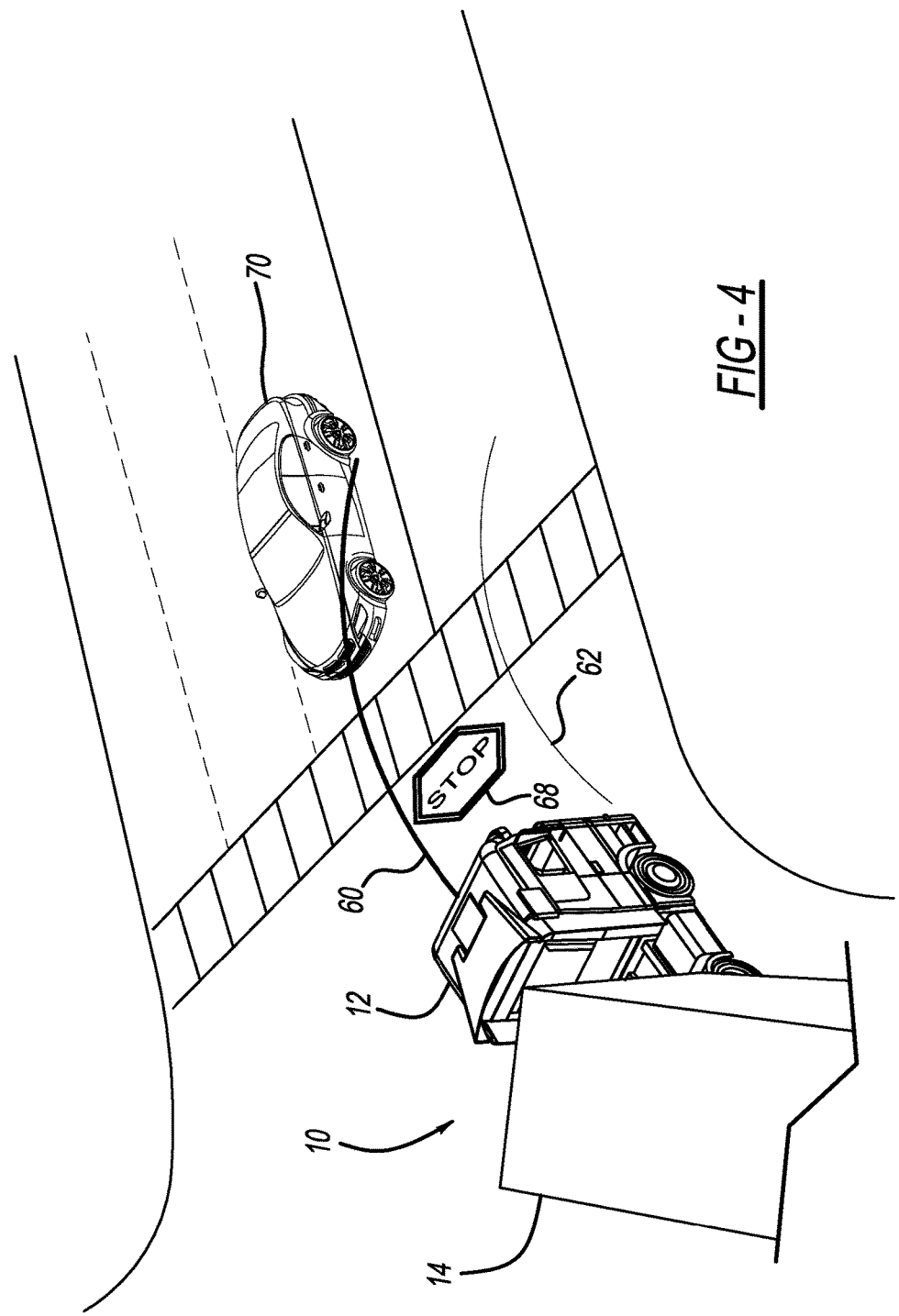
FIG. 4 illustrates the subject vehicle turning a corner with the laser line and graphics projection system projecting laser lines on the roadway to visually indicate the truck turning path and projecting a graphic driving instruction.
Figure 5:
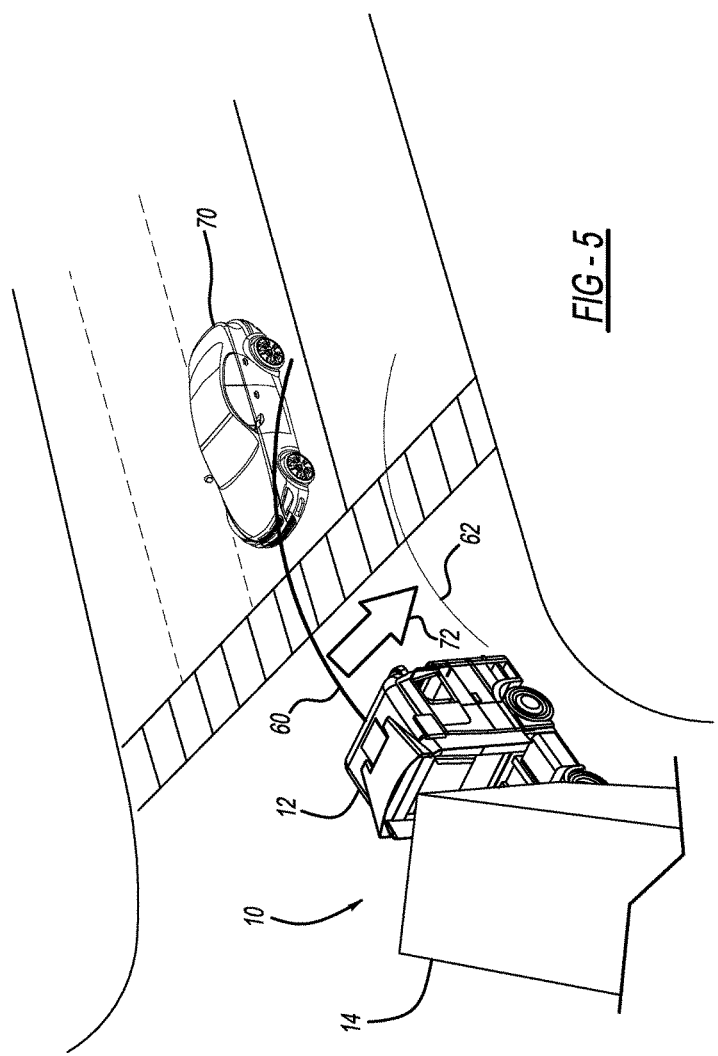
FIG. 5 illustrates the subject vehicle turning a corner with the laser line and graphics projection system projecting laser lines on the roadway to visually indicate the truck turning path and projecting a graphic driving instruction.
Figure 6:
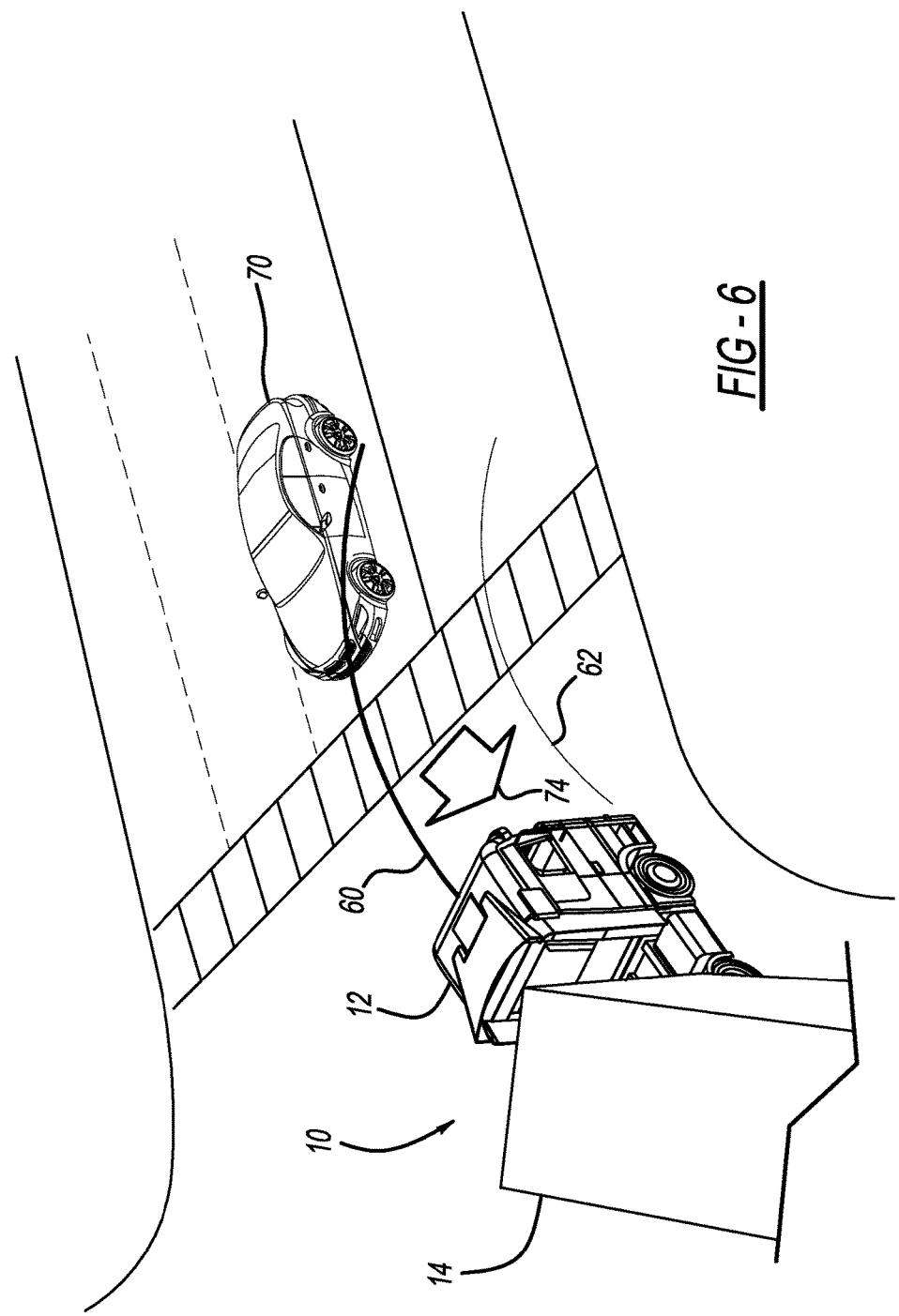
FIG. 6 illustrates the subject vehicle turning a corner with the laser line and graphics projection system projecting laser lines on the roadway to visually indicate the truck turning path and projecting a graphic driving instruction.

With reference to FIGS. 4 to 6, in addition to, or as an alternative to, projecting laser lines corresponding to a turning path of the vehicle 10, the laser line and graphics projection system can project a graphical display onto the roadway in front of the vehicle 10 including instructions or warnings for the driver of the vehicle 10. For example, with reference to FIG. 4, when an object, such as the secondary vehicle 70, is located within the turning path of the vehicle 10, the controller 28 can control the positional actuators 42 so that the light source projectors 40 project a stop sign display 68 in the roadway in front of the vehicle. In this way, the driver of the vehicle 10 can be alerted to stop the vehicle 10 before colliding with the object, such as the secondary vehicle 70, positioned within the turning path of the vehicle 10. Similarly, with reference to FIG. 5, when an object, such as the secondary vehicle 70, is located within the turning path of the vehicle 10, the controller 28 can control the positional actuators 42 so that the light source projectors 40 project a right arrow display 72 in the roadway in front of the vehicle. In this way, the driver of the vehicle 10 can be alerted to turn the steering wheel of the steering system 20 further to the right in order to avoid colliding with the object, such as the secondary vehicle 70, positioned within the turning path of the vehicle 10. Similarly, with reference to FIG. 6, when an object, such as the secondary vehicle 70, is located within the turning path of the vehicle 10, the controller 28 can control the positional actuators 42 so that the light source projectors 40 project a back arrow display 74 in the roadway in front of the vehicle. In this way, the driver of the vehicle 10 can be alerted to reverse the vehicle 10 in order to avoid colliding with the object, such as the secondary vehicle 70, positioned within the turning path of the vehicle 10.

As such, the laser line and graphics projection system can beneficially project laser lines onto a roadway in front of a vehicle 10 indicating the current turning path of the vehicle 10. In addition, the laser line and graphics projection system can beneficially project graphical displays with instructions or warnings for a driver of a vehicle 10 onto a roadway in front of the vehicle 10 to assist the driver of the vehicle 10 in avoiding a collision with another object in or around the roadway.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used is for the purpose of describing particular example embodiments only and is not intended to be limiting. The singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "and/or" includes any and all combinations of one or more of the associated listed items.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system comprising:
   at least one light source projector with at least one positional actuator mounted on a subject vehicle that projects at least one laser line on a roadway upon which the subject vehicle is traveling;
   a controller that receives steering angle data from a steering system of the subject vehicle, the steering angle data corresponding to a steering angle of the subject vehicle; and
   at least one sensor that senses an object located in a surrounding area of the vehicle;
   wherein the controller is configured to determine a turning path of the subject vehicle based on the steering angle data, to determine a location of the object, to determine whether the object is located in the turning path of the subject vehicle based on the determined turning path and the determined location of the object, and to control the at least one positional actuator to project the at least one laser line on the roadway to correspond to the determined turning path of the subject vehicle and to project an arrow on the roadway in front of the subject vehicle, the arrow graphically indicating a direction to steer the subject vehicle to avoid colliding with the object.

2. The system of claim 1, wherein the at least one laser line includes a first laser line corresponding to a driver side of the vehicle and a second laser line corresponding to a passenger side of the vehicle.

3. The system of claim 1, wherein the controller generates an alert in response to determining that the object is located within the determined turning path of the subject vehicle.

4. The system of claim 3, wherein the alert includes changing a color of the at least one laser line projected on the roadway.

5. The system of claim 3, wherein the alert includes at least one of blinking or flashing the at least one laser line projected on the roadway.

6. The system of claim 3, wherein the at least one sensor includes at least one of a camera, a Lidar sensor, a radar sensor, and an ultrasonic sensor.

7. The system of claim 1, wherein the subject vehicle includes a tractor unit and a semi-trailer and the controller determines the turning path of the subject vehicle based on a turning path of the tractor unit.

8. The system of claim 7, wherein the controller determines a turning path of the semi-trailer and wherein the at least one laser line includes a first set of laser lines corresponding to the turning path of the tractor unit and a second set of laser lines corresponding to the turning path of the semi-trailer.

9. The system of claim 1, wherein the at least one light source projector includes a laser diode.

10. The system of claim 1, wherein the at least one laser line includes two laser lines indicating the determined turning path of the subject vehicle and wherein the arrow is projected on the roadway between the two laser lines.

11. A method comprising:
    projecting, with at least one light source projector having at least one positional actuator mounted on a subject vehicle, at least one laser line on a roadway upon which the subject vehicle is traveling;
    receiving, with a controller, steering angle data from a steering system of the subject vehicle, the steering angle data corresponding to a steering angle of the subject vehicle;
    determining, with the controller, a turning path of the subject vehicle based on the steering angle data;
    sensing, with at least one sensor, an object located in a surrounding area of the vehicle;
    determining, with the controller, a location of the object and whether the object is located within the determined turning path of the subject vehicle based on the determined turning path and the determined location of the object; and controlling, with the controller, the at least one positional actuator to project the at least one laser line on the roadway to correspond to the determined turning path of the subject vehicle and to project an arrow on the roadway in front of the subject vehicle, the arrow graphically indicating a direction to steer the subject vehicle to avoid colliding with the object.

12. The method of claim 11, wherein the at least one laser line includes a first laser line corresponding to a driver side of the vehicle and a second laser line corresponding to a passenger side of the vehicle.

13. The method of claim 11, further comprising:
generating, with the controller, an alert in response to determining that the object is located within the determined turning path of the subject vehicle.

14. The method of claim 13, wherein generating the alert includes changing a color of the at least one laser line projected on the roadway.

15. The method of claim 13, wherein generating the alert includes at least one of blinking or flashing the at least one laser line projected on the roadway.

16. The method of claim 13, wherein the at least one sensor includes at least one of a camera, a Lidar sensor, a radar sensor, and an ultrasonic sensor.

17. The method of claim 11, wherein the subject vehicle includes a tractor unit and a semi-trailer, the method further comprising determining, with the controller, the turning path of the subject vehicle based on a turning path of the tractor unit.

18. The method of claim 17, further comprising determining, with the controller, a turning path of the semi-trailer, wherein the at least one laser line includes a first set of laser lines corresponding to the turning path of the tractor unit and a second set of laser lines corresponding to the turning path of the semi-trailer.

19. The method of claim 11, wherein the at least one light source projector includes a laser diode.

20. The method of claim 11, wherein the at least one laser line includes two laser lines indicating the determined turning path of the subject vehicle and wherein the arrow is projected on the roadway between the two laser lines.

* * * * *